Nov. 11, 1924. 1,514,916
A. LEATHERMAN
SCRIBE GAUGE
Filed Sept. 14, 1922
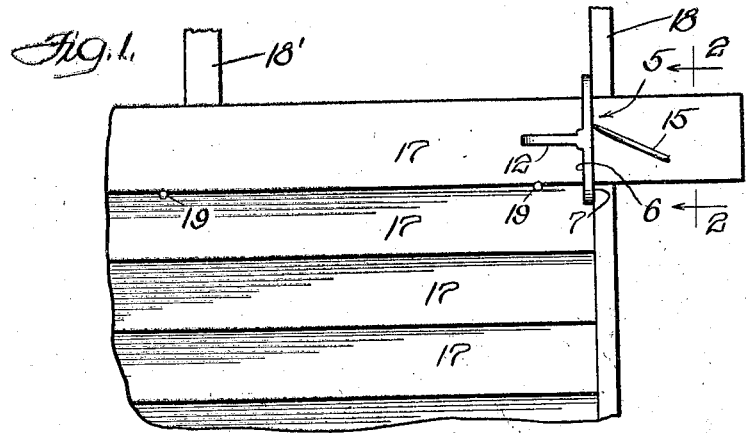
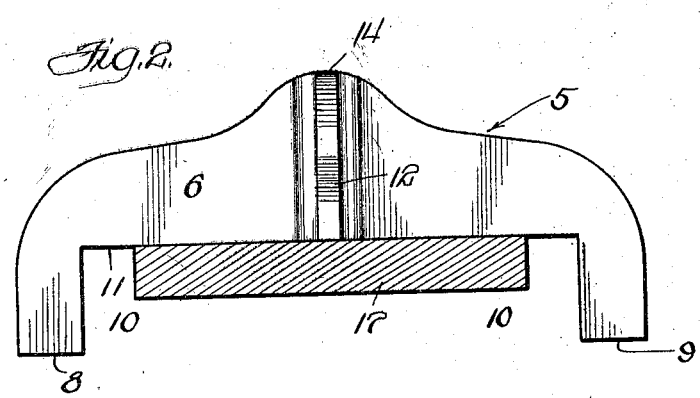
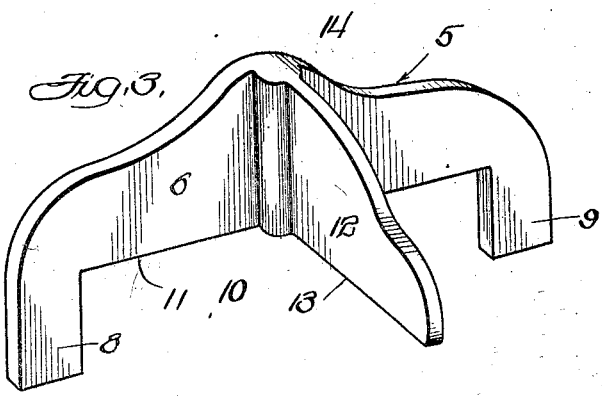
Inventor:
Abraham Leatherman
By Force Bain & Hinkle
Attys.
Witness:
W. K. Olson Patented Nov. 11, 1924.

1,514,916

UNITED STATES PATENT OFFICE.

ABRAHAM LEATHERMAN, OF MUSKEGON HEIGHTS, MICHIGAN, ASSIGNOR OF ONE-HALF TO ORR LEATHERMAN, OF MUSKEGON HEIGHTS, MICHIGAN.

SCRIBE GAUGE.

Application filed September 14, 1922. Serial No. 588,162.

*To all whom it may concern:*

Be it known that I, ABRAHAM LEATHERMAN, a citizen of the United States, residing at Muskegon Heights, in the county of Muskegon and State of Michigan, have invented certain new and useful Improvements in Scribe Gauges, of which the following is a specification.

This invention relates to scribe gauges, such as those used by cabinet makers, or joiners, carpenters and the like.

One of the objects of the invention is to make a gauge that is convenient in use, accurate and inexpensive in its production.

Another object is to provide a one piece gauge, without movable parts that may get out of adjustment, and which is of such form that it may readily and quickly be seized and conveniently handled when applying it to the work.

A further object is to provide a gauge having a part which will hold the face of the scribing surface in a plane at right angles to the surface scribed to more accurately determine the location of the line of demarcation.

Other objects and advantages will hereinafter appear from a consideration of the following description when taken in conjunction with the drawings, wherein:—

Fig. 1 is an elevation of a fragment of a weather boarded wall showing the manner of using the gauge.

Fig. 2 is an enlarged cross section taken on line 2—2 of Fig. 1.

Fig. 3 is an isometric perspective elevation of the gauge looking at its rear side.

In all the views the same reference characters are employed to indicate similar parts.

The gauge 5 consists of the flat elongated plate 6 having a plane face 7 straight edge 11, and projections 8 and 9 at its respective ends, said projections being coplanar with said plate and extending substantially at right angles to said straight edge. The projections form the notch 10 having a straight edge 11 as a boundary. A rearwardly extending handle 12 comprises a second plate secured to the mid-portion of a side of the first named plate and extending in a plane at substantial right angles thereto and to said straight edge as at 14, the lower edge 13 of the handle is straight and lies in the same plane as the straight edge 11.

When the edges 11 and 13 rest upon a plane surface the front face 7 is thereby held in a plane at right angles to said surface. The line to be scribed may be made with a stylus or pencil 15, as shown in Fig. 1, at the bottom of the face 7 along the face 11.

In Fig. 1 the gauge is shown for marking boards 17 to be cut in line with the outer surface of the stud 18. The board rests upon temporary nails 19. The front surface of the legs 8 and 9 are brought into contact with the outer surface of the stud 18 with the leg 12 resting on the adjacent surface of the board 17, then the stylus is drawn along the front face 7 of the member 6 near its lower edge 11 and the board thus marked to indicate the line where it shall be severed before nailing to the studs 18—18'.

With the face 7 held at right angles to the contacting face of the board 17, the edge 11 of the gauge is positioned immediately over the place where the board should be severed.

There are many other uses for the tool that will be readily recognized by the workman using it.

Having described my invention what I claim as new and desire to secure by Letters Patent, is:—

A clapboard marking gauge comprising a flat elongated plate having one longitudinal edge straight and a projection at each end of said straight edge, said projections being coplanar with said plate and extending substantially at right angles to said straight edge, and a handle comprising a second plate secured to the mid-portion of a side of said first-named plate and extending in a plane at substantial right angles to the plane thereof and to said straight edge, the lower edge of said second plate being straight and lying in the same plane as the straight edge of said first-named plate.

In testimony whereof I hereunto subscribe my name.

ABRAHAM LEATHERMAN.